May 27, 1924.

C. W. SVENSON

INSTRUMENT MOUNT

Filed Oct. 31, 1921

1,495,273

Inventor
CHARLES W. SVENSON.
By his Attorneys

Patented May 27, 1924.

1,495,273

UNITED STATES PATENT OFFICE.

CHARLES W. SVENSON, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

INSTRUMENT MOUNT.

Application filed October 31, 1921. Serial No. 511,668.

*To all whom it may concern:*

Be it known that I, CHARLES W. SVENSON, a citizen of the United States, residing at New Britain, county of Hartford, State of Connecticut, have invented a certain new and useful Improvement in Instrument Mounts, of which the following is a full, clear, and exact description.

The present invention relates to means for mounting an instrument, such as a speedometer, upon the instrument board of an automobile, and has for its object to provide novel and improved means of this character.

The several features of the invention will be clearly understood from the following description and accompanying drawings, in which—

Figure 1:
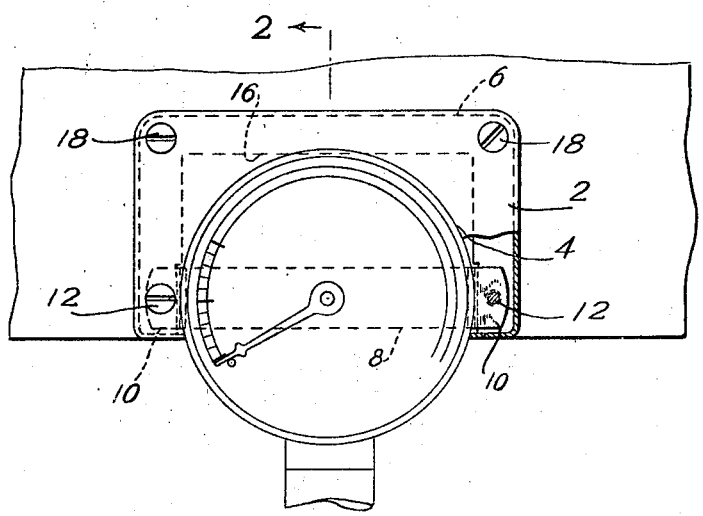
Figure 1 is a front view of a speedometer and a portion of an instrument board of an automobile, with a mount for the speedometer applied thereto embodying the features of the invention in their preferred form.
Figure 2:
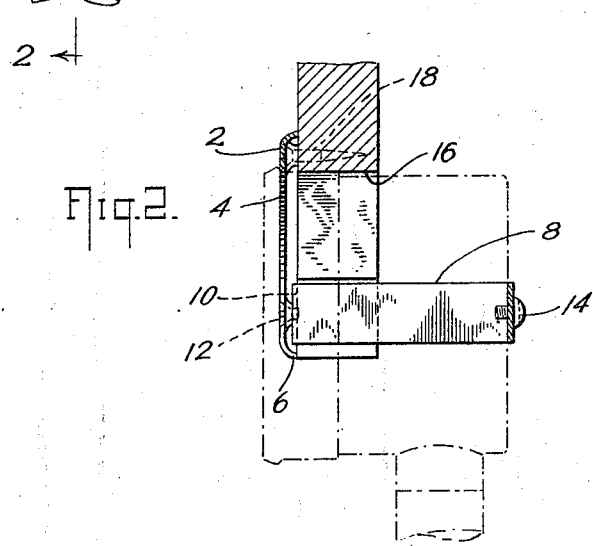
Fig. 2 is a sectional elevation taken on the line 2—2 of Fig. 1, with the speedometer indicated by broken lines.
Figure 3:
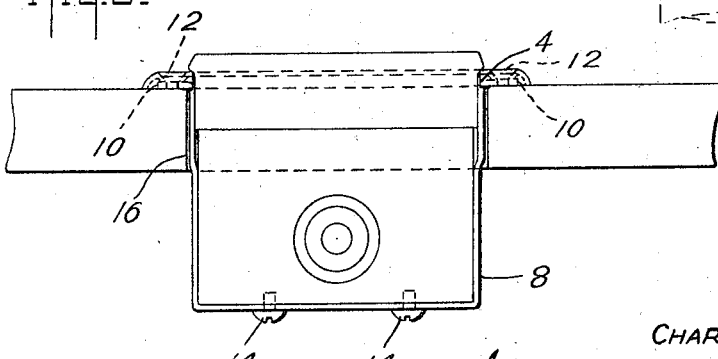
Fig. 3 is a bottom plan view of the parts shown in Fig. 1.

The instrument mount illustrated in the drawings comprises a rectangular plate 2 having a recess 4 which opens out through the lower edge of the plate. The plate is made of sheet metal and its edge is turned over to provide a rearwardly projecting flange 6 at right angles to the body of the plate. The instrument mount is also provided with a substantially U-shaped metallic strap 8 having its ends turned outwardly at right angles to provide lips 10 which are secured to the plate adjacent to the lower edge thereof by means of screws 12 extending through screw holes in the plate and screw-threaded through apertures in the lips 10. To apply the speedometer to the instrument mount the rear end thereof is introduced into the recess in the plate and positioned against the transverse portion of the U-shaped strap 8, the recess 4 in the plate being of a size and shape to closely fit the periphery of the forward end of the speedometer, and the strap 8 being of a size and shape to closely embrace the rear wall and sides of the speedometer. The speedometer is held on the instrument mount by means of screws 14 extending through apertures in the transverse portion of the strap 8 and screw-threaded into the rear wall of the casing of the speedometer. Previous to applying the instrument mount to the instrument board, a recess 16 is cut in the instrument board, which recess opens out through the lower edge of the board. To apply the instrument mount with the speedometer attached, to the instrument board, the rear end of the speedometer and strap 8 is placed within the recess 16 in the instrument board and the plate 2 is brought against the front face of the board with the lower edge of the plate flush with the lower edge of the board. The plate 2 may then be attached to the board by means of screws 18 which extend through screw holes in the plate near its upper edge and are screwed into the board.

From the foregoing it will be apparent that the instrument mount and speedometer thoroughly cover the recess in the board, and that the instrument mount is of simple and rigid construction, attractive in appearance, and may be easily installed on the instrument board. It will also be apparent that no portion of the instrument mount extends over the lower portion of the speedometer so that the speedometer may be readily removed from and applied to the instrument mount either sidewise or endwise without detaching the mount from the instrument board and, also, that free access may be had to the re-setting pawls and all other parts of the lower portion of the speedometer.

While it is preferred to employ the specific construction and arrangement of parts illustrated and described, it is to be understood that this construction and arrangement is not essential except so far as specified in the claims.

What I claim is:

1. The combination with an automobile instrument board having a recess opening out through one edge of the board, of an instrument mount comprising a plate having a recess opening out through one edge of the plate for accommodating an instrument, said plate being adapted to be secured to the front face of the board with the recesses in the plate and board registering, and means comprising a strap extending rearwardly through the recess in the board and having its ends connected with the plate for embracing and supporting the instrument.

2. The combination with an automobile instrument board having a recess opening out through one edge of the board, of an instrument mount comprising a plate having a recess opening out through one edge of the plate and suitably shaped to accommodate a portion of the instrument, said plate being adapted to be secured to the front face of the board with the recesses in the plate and board registering, and means comprising a substantially U-shaped strap arranged at right angles to the plate and extending rearwardly through the recess in the board and having its ends detachably secured to the plate adjacent said edge of the plate for embracing and supporting the instrument.

3. The combination with an automobile instrument board having a recess opening out through one edge of the board, of an instrument mount comprising a plate having a recess opening out through one edge thereof for accommodating the instrument, said plate being adapted to be secured to the front face of the board with the recesses in the plate and board registering, a supporting member projecting from the plate and extending rearwardly through said recess in the board, and means accessible to the operator when the instrument is in place in said recesses in the plate and board for detachably securing the instrument to said supporting member.

4. The combination with an automobile instrument board having a recess opening out through one edge of the board, of an instrument mount comprising a plate having a recess opening out through one edge of the plate and suitably shaped to accommodate a portion of the instrument, said plate being adapted to be secured to the front face of the board with the recesses in the plate and board registering, and means comprising a substantially U shaped strap arranged parallel with the lower edge of the board and extending rearwardly through the recess in the board and having its ends bent outwardly and positioned between the plate and board for embracing and supporting the instrument, screws extending through apertures in the plate and said ends for securing the plate and strap to the board, and screws for securing the instrument to said strap.

5. The combination with an automobile instrument board having a recess opening out through one edge of the board of an instrument mount comprising a plate having a substantially semi-circular recess opening out through one edge thereof registering with the recess in the board and having its wall arranged to fit the upper portion of the forward end of the cylindrical case of an instrument, means for securing the plate to the board, a strap extending rearwardly from the board having its ends secured to the board and constructed and arranged to embrace the rear portion of said instrument case, and screws for securing the case to said strap.

6. The combination with an automobile instrument board having a recess opening out through one edge of the board, of an instrument mount comprising a plate having a substantially semi-circular recess opening out through one edge thereof registering with the recess in the board and having its wall arranged to fit the upper portion of the forward end of the cylindrical case of an instrument, means for detachably securing the plate to the board, a supporting member extending rearwardly through said recess, and a device for engagement with the rear side of said instrument when the instrument is in place in said recesses in the plate and board for detachably securing said instrument to said supporting member.

CHARLES W. SVENSON.